US012531379B2

(12) United States Patent
Kojima et al.

(10) Patent No.: US 12,531,379 B2
(45) Date of Patent: Jan. 20, 2026

(54) CABLE-EQUIPPED CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yusuke Kojima, Osaka (JP); Kazuaki Hamada, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 289 days.

(21) Appl. No.: 18/287,265

(22) PCT Filed: Mar. 25, 2022

(86) PCT No.: PCT/JP2022/014267
§ 371 (c)(1),
(2) Date: Oct. 17, 2023

(87) PCT Pub. No.: WO2022/224701
PCT Pub. Date: Oct. 27, 2022

(65) Prior Publication Data

US 2024/0204463 A1 Jun. 20, 2024

(30) Foreign Application Priority Data

Apr. 19, 2021 (JP) ................................ 2021-070146

(51) Int. Cl.
*H01R 13/6592* (2011.01)
*H01R 4/18* (2006.01)
*H01R 4/20* (2006.01)

(52) U.S. Cl.
CPC ......... *H01R 13/6592* (2013.01); *H01R 4/183* (2013.01); *H01R 4/20* (2013.01)

(58) Field of Classification Search
CPC ...... H01R 13/6592; H01R 4/183; H01R 4/20; H01R 13/6593; H01R 9/0518; H01R 13/585
See application file for complete search history.

(56) References Cited

U.S. PATENT DOCUMENTS

2020/0014129 A1 1/2020 Hamada et al.
2022/0255270 A1 8/2022 Maesoba et al.
(Continued)

FOREIGN PATENT DOCUMENTS

JP 2006244816 A * 9/2006
JP 2020-057493 A 4/2020

OTHER PUBLICATIONS

International Search Report issued on Jun. 14, 2022 for WO 2022/224701 A1 (4 pages).

*Primary Examiner* — Travis S Chambers
(74) *Attorney, Agent, or Firm* — Venjuris, P.C.

(57) ABSTRACT

A cable-equipped connector is provided with a cable including wires, a sheath, a sleeve and a braided wire having a folded portion, a connector housing connected to the wires, and a shield member including a covering portion for covering the connector housing, a barrel portion to be crimped to an end part of the cable where the folded portion is disposed, and a plurality of protrusions extending from the barrel portion toward the sheath. The plurality of protrusions include first and second long protrusions having tip parts sinking into the sheath and first short protrusions shorter
(Continued)

than the first and second long protrusions and having such a length that tip parts do not sink into the sheath, but are lockable to the sleeve.

4 Claims, 9 Drawing Sheets

(56) References Cited

U.S. PATENT DOCUMENTS

| | | | | |
|---|---|---|---|---|
| 2023/0035860 | A1* | 2/2023 | Hibino | H01R 13/6473 |
| 2024/0313483 | A1* | 9/2024 | Kojima | H01R 13/65915 |

* cited by examiner

CABLE-EQUIPPED CONNECTOR

CROSS REFERENCE TO RELATED APPLICATIONS

This application is a national phase of PCT application No. PCT/JP2022/014267, filed on 25 Mar. 2022, which claims priority from Japanese patent application No. 2021-070146, filed on 19 Apr. 2021, all of which are incorporated herein by reference.

TECHNICAL FIELD

A technique disclosed by this specification relates to a cable-equipped connector.

BACKGROUND

A terminal-equipped shielded cable having an outer conductor terminal connected to an end part of a shielded cable is known (see, Patent Document 1). The shielded cable is provided with a plurality of coated wires, a braided wire collectively covering these coated wires and a sheath covering further the outer periphery of the braided wire. In the end part of the shielded cable, the sheath is stripped to expose an end part of the braided wire from the sheath. The end part of the braided wire exposed from the sheath is folded onto the outside of the sheath, thereby forming a folded portion. A sleeve made of metal is disposed outside an end part of the sheath and inside the folded portion. The outer conductor terminal includes a barrel portion, and the barrel portion is crimped to the end part of the sheath from the outside of the folded portion.

The outer conductor terminal includes protrusions projecting inward from the barrel portion. According to such a configuration, if a tensile force is applied to the shielded cable, the sleeve comes into contact with the protrusions, whereby the detachment of the shielded cable from the barrel portion is suppressed.

PRIOR ART DOCUMENT

Patent Document

Patent Document 1: JP 2018-147564 A

SUMMARY OF THE INVENTION

Problems to be Solved

In the terminal-equipped shielded cable as described above, it is, for example, thought to strongly crimp the barrel portion to the shielded cable in order to increase a fixing force of the outer conductor terminal to the shielded cable. However, if a crimping force is excessively large, there is a concern for deterioration in communication performance, cable breakage and the like.

Means to Solve the Problem

A cable-equipped connector disclosed by this specification is provided with a cable including a wire, a sheath surrounding the wire, a sleeve surrounding an end part of the sheath and a braided wire interposed between the wire and the sheath, the braided wire including a folded portion exposed from the end part of the sheath and folded on outside of the sleeve, a connector housing connected to the wire, and a shield member including a covering portion for covering the connector housing, a barrel portion to be crimped to an end part of the cable where the folded portion is disposed, and a plurality of protrusions extending from the barrel portion toward the sheath, the plurality of protrusions including at least one long protrusion having a tip part sinking into the sheath and at least one short protrusion shorter than the long protrusion and having such a length that a tip part does not sink into the sheath, but is lockable to the sleeve.

Effect of the Invention

According to the cable-equipped connector disclosed by this specification, the detachment of the cable from the barrel portion can be effectively suppressed.

DETAILED DESCRIPTION TO EXECUTE THE INVENTION

Figure 1:
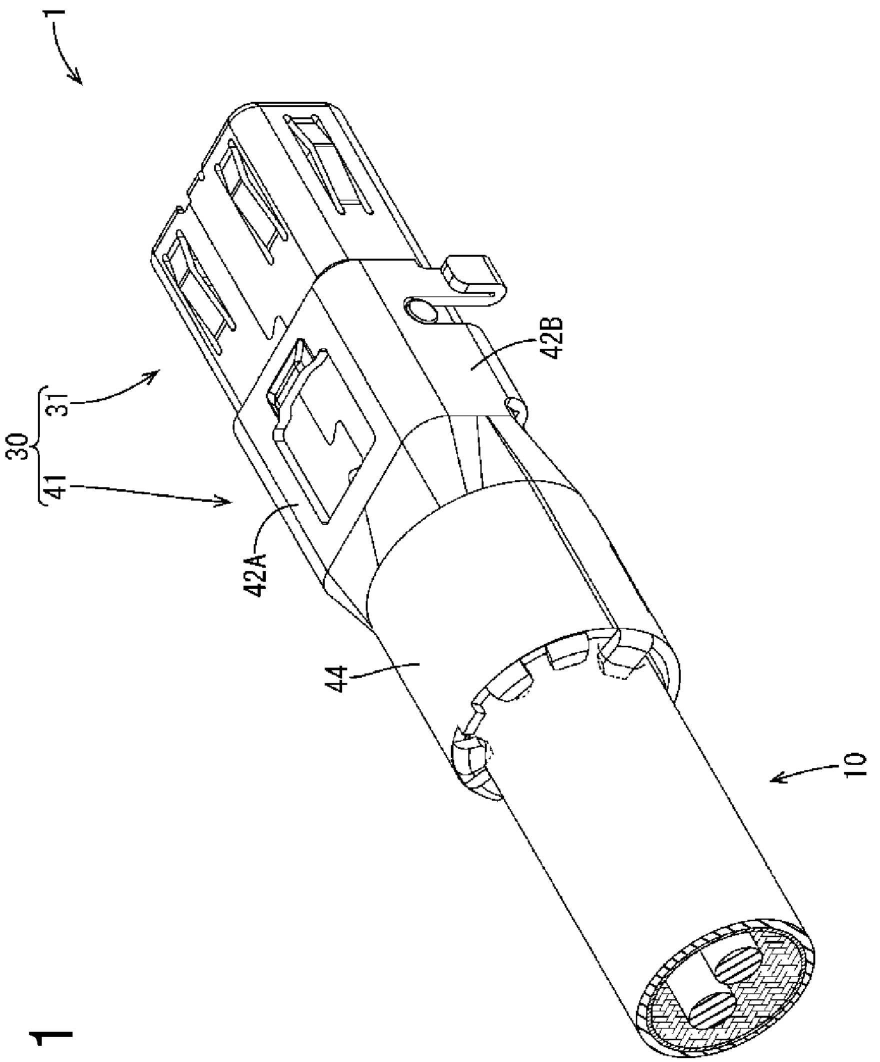
FIG. 1 is a perspective view of a cable-equipped connector according to an embodiment.

Summary of Embodiments (1) The cable-equipped connector disclosed by this specification is provided with a cable including a wire, a sheath surrounding the wire, a sleeve surrounding an end part of the sheath and a braided wire interposed between the wire and the sheath, the braided wire including a folded portion exposed from the end part of the sheath and folded on outside of the sleeve, a connector housing connected to the wire, and a shield member including a covering portion for covering the connector housing, a barrel portion to be crimped to an end part of the cable where the folded portion is disposed, and a plurality of protrusions extending from the barrel portion toward the sheath, the plurality of protrusions including at least one long protrusion having a tip part sinking into the sheath and at least one short protrusion shorter than the long protrusion and having such a length that a tip part does not sink into the sheath, but is lockable to the sleeve.

According to the above configuration, the long protrusion relatively long and sinking into the sheath and the short protrusion relatively short, not sinking into the sheath, but lockable to the sleeve are used in combination. In this way, a stronger fixing force is obtained and the detachment of the cable from the barrel portion is effectively restricted as compared to the case where all the protrusions are sinking into the sheath or none of the protrusions is sinking into the sheath.

(2) In the cable-equipped connector of (1) described above, the barrel portion may include a base portion to be placed on the end part of the cable and a crimping piece extending from the base portion and to be wound around the end part of the cable, and at least a part of the long protrusion may be disposed closest to the crimping piece.

An interval between the barrel portion and the sleeve easily varies near the crimping piece. Thus, if the short protrusion is arranged near the crimping piece, it is difficult to adjust the short protrusion to such a length that the short protrusion does not sink into the sheath, but is reliably lockable to the sleeve. Thus, the protrusion disposed closest to the crimping piece is preferably the long protrusion relatively long and configured to sink into the sheath.

(3) In the cable-equipped connector of (1) or (2) described above, a total number of the protrusions provided in the shield member may be four and two of the protrusions may be the short protrusions. Alternatively, in the cable-equipped connector of (1) or (2) described above, a total number of the protrusions provided in the shield member may be six and two of the protrusions may be the short protrusions.

When the number of the protrusions is as described above, a strong fixing force is obtained and the detachment of the cable from the barrel portion can be effectively restricted.

DETAILS OF EMBODIMENTS

A specific example of the technique disclosed by this specification is described below with reference to the drawings. Note that the present invention is not limited to these illustrations, but is represented by claims and intended to include all changes in the scope of claims and in the meaning and scope of equivalents.

First Embodiment

A first embodiment is described with reference to FIGS. 1 to 6. A cable-equipped connector 1 of this embodiment is, as shown in FIGS. 1 and 2, provided with a cable 10 including wires 11, a connector housing 20 to be connected to end parts of the wires 11 and a shield member 30 for covering the connector housing 20 by being crimped to an end part 10A of the cable 10.

Cable 10

Figure 2:
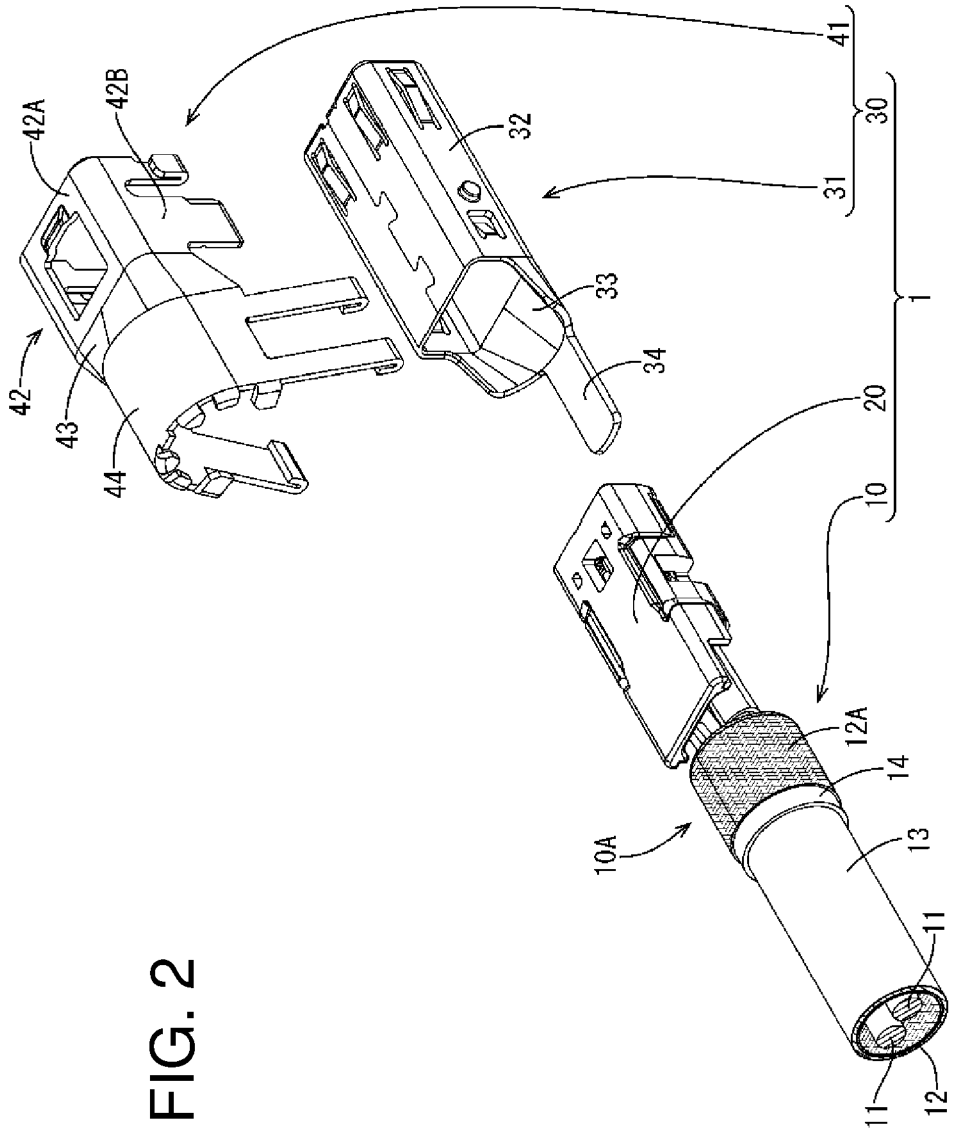
FIG. 2 is an exploded perspective view of the cable-equipped connector of the embodiment.

As shown in FIG. 2, the cable 10 is provided with a plurality of (two in this embodiment) wires 11, a braided wire 12 collectively covering the plurality of wires 11, a sheath 13 covering the outer periphery of the braided wire 12 and a sleeve 14 surrounding an end part of the sheath 13.

Although not shown in detail, each wire 11 is provided with a core wire made of metal and an insulation coating made of insulating synthetic resin and surrounding the outer periphery of the core wire. An arbitrary metal such as copper, copper alloy, aluminum or aluminum alloy can be appropriately selected as the metal for constituting the core wire if necessary.

The braided wire 12 is a member formed into a tubular shape by braiding a plurality of electrically conductive wire materials into a mesh. The electrically conductive wire materials may be, for example, wire materials made of metal or wire materials obtained by adhering metal foils to strands made of synthetic resin. An arbitrary metal such as copper or copper alloy can be appropriately selected as the metal for constituting the wire materials made of metal or the metal foils to be adhered to the strands made of synthetic resin if necessary. In this embodiment, wire materials made of copper or copper alloy are used.

The sheath 13 is made of insulating synthetic resin. The sheath 13 is stripped at the end part 10A of the cable 10, and the end parts of the wires 11 and the end part of the braided wire 12 are exposed from the sheath 13. Unillustrated terminal fittings are connected to the end parts of the wires 11. The end part of the braided wire 12 exposed from the sheath 13 is folded toward the sheath 13, thereby forming a folded portion 12A placed on the outside of the sheath 13.

The sleeve 14 is crimped to the end part of the sheath 13 from outside and disposed inside the folded portion 12A. The sleeve 14 is made of metal and has a hollow cylindrical shape. An arbitrary metal such as copper, copper alloy, aluminum or aluminum alloy can be appropriately selected as the metal for constituting the sleeve 14 if necessary. In this embodiment, copper or copper alloy is used.

Connector Housing 20

The connector housing 20 is made of synthetic resin and has a substantially rectangular parallelepiped shape as shown in FIG. 2. The end parts of the wires 11 and the terminal fittings connected to the end parts of the wires 11 are accommodated inside the connector housing 20.

Shield Member 30

The shield member 30 is made of metal and, as shown in FIGS. 1 and 2, provided with a first shield member 31 and a second shield member 41.

The first shield member 31 is formed by punching and bending a metal plate material. As shown in FIG. 2, this first shield member 31 includes a tube portion 32 having a rectangular tube shape, a first coupling portion 33 extending from one end of the tube portion 32 and a plate-like tongue piece 34 extending from the first coupling portion 33. The connector housing 20 is accommodated into the tube portion 32.

Figure 3:
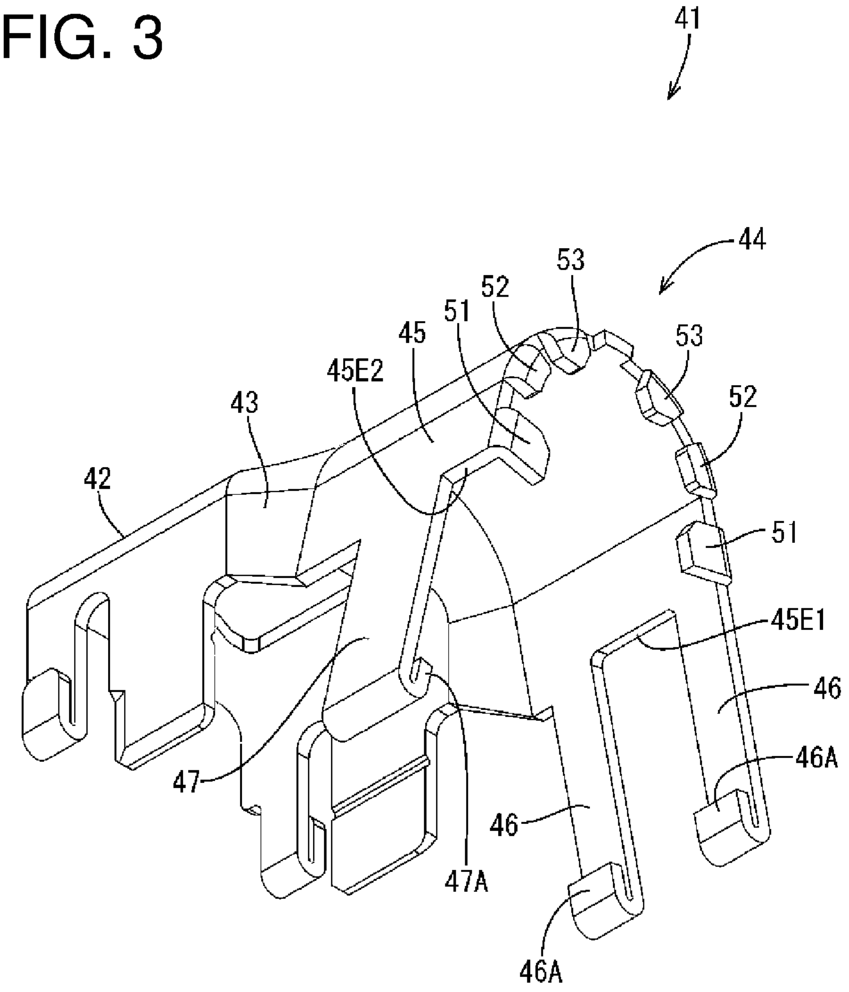
FIG. 3 is a perspective view of a second shield member of the embodiment.

The second shield member 41 is formed by punching and bending a metal plate material. As shown in FIGS. 2 and 3, this second shield member 41 includes a covering portion 42 for covering the tube portion 32 of the first shield member 31, a second coupling portion 43 extending from the covering portion 42, a barrel portion 44 extending from the second coupling portion 43 and to be crimped to the end part 10A of the cable 10 and a plurality of protrusions 51, 52 and 53 extending from the barrel portion 44.

As shown in FIGS. 1, 2 and 3, the covering portion 42 has a ceiling plate 42A in the form of a rectangular plate disposed along one surface of the tube portion 32 and two side plates 42B respectively extending from two side edges of the ceiling plate 42A. The two side plates 42B extend straight from the ceiling plate 42A as shown in FIGS. 2 and 3 in a single state of the second shield member 41 not assembled with the first shield member 31, and are bent along the tube portion 32 as shown in FIG. 1 with the second shield member 41 assembled with the first shield member 31.

Figure 4:
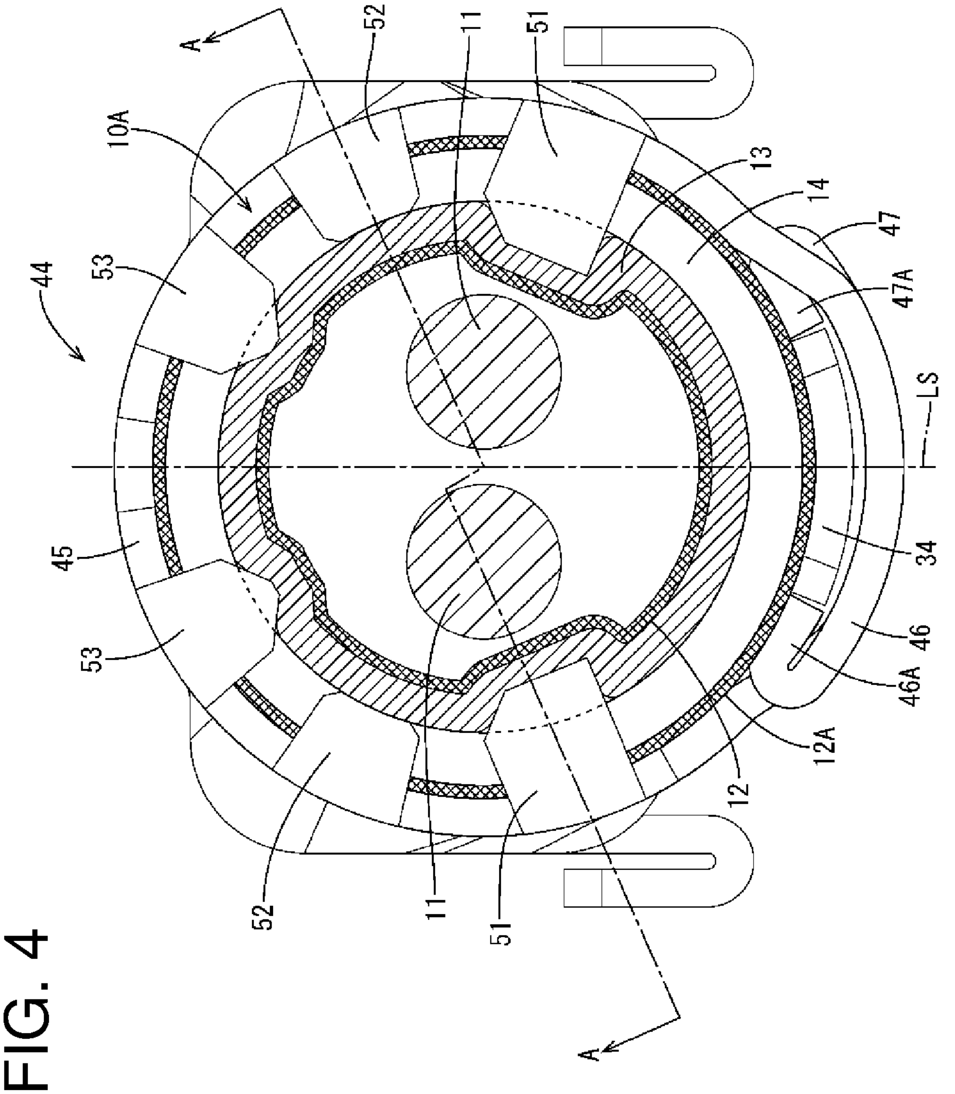
FIG. 4 is a back view of the cable-equipped connector of the embodiment.

As shown in FIGS. 1 and 4, the barrel portion 44 is crimped to wind around the end part 10A of the cable 10 from the outside of the folded portion 12A. As shown in FIG. 3, the barrel portion 44 includes a base portion 45 in the form of a half-pipe, two first crimping pieces 46 extending from the base portion 45 and a second crimping piece 47 likewise extending from the base portion 45. Each of the two first crimping pieces 46 has a strip-like shape and extends from one side edge 45E1, out of two side edges 45E1, 45E2 of the base portion 45. The two first crimping pieces 46 are arranged at an interval from each other. The second crimping piece 47 has a strip-like shape and extends from the other side edge 45E2 of the base portion 45. A tip part of each of the two first crimping pieces 46 is folded inwardly and this folded part serves as a first open stop piece 46A. A tip part of the second crimping piece 47 is also folded inwardly and this folded part serves as a second open stop piece 47A.

In a state where the barrel portion 44 is not crimped to the end part 10A of the cable 10, the first and second crimping pieces 46, 47 extend straight from the base portion 45 as shown in FIG. 3 and the barrel portion 44 is U-shaped as a whole. With the barrel portion 44 crimped to the end part 10A of the cable 10, the barrel portion 44 is wound around the end part 10A of the cable 10 and has a substantially hollow cylindrical shape as a whole as shown in FIG. 4. The second crimping piece 47 is located between the two first crimping pieces 46. Further, the tongue piece 34 is disposed between the first and second crimping pieces 46, 47 and the folded portion 12A, and the first and second open stop pieces 46A, 47A are disposed on both sides of the tongue piece 34.

The plurality of protrusions 51, 52 and 53 are plate pieces extending from the base portion 45 toward the sheath 13 and restrict the detachment of the cable 10 from the barrel portion 44. As shown in FIG. 3, the protrusions 51, 52 and 53 extend from an end edge on a side opposite to the covering portion 42 and the second coupling portion 43 in the base portion 45.

Figure 5:
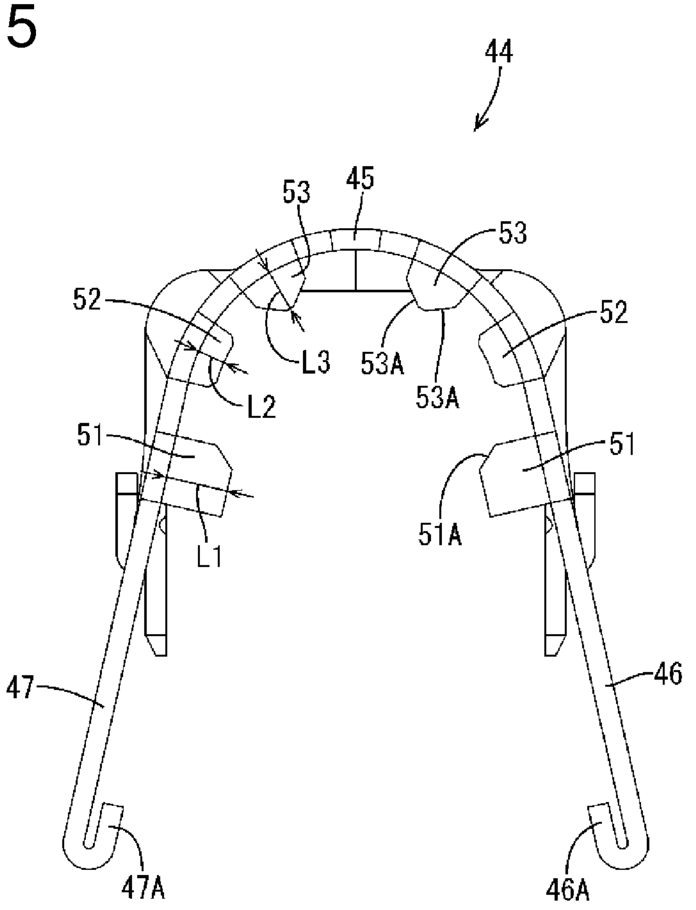
FIG. 5 is a back view of the second shield member of the embodiment.

As shown in FIGS. 3, 4 and 5, in this embodiment, the second shield member 41 includes six protrusions 51, 52 and 53. Two of those are first long protrusions 51 (an example of a long protrusion), the other two are second short protrusions 52 (an example of a short protrusion) and the remaining two are second long protrusions 53 (an example of the long protrusion). As shown in FIG. 5, a projecting length L2 of the first short protrusion 52 represented by a length from the base portion 45 to the tip of the first short protrusion 52 is shorter than a projecting length L1 of the first long protrusion 51 represented by a length from the base portion 45 to the tip of the first long protrusion 51 and a projecting length L3 of the second long protrusion 53 represented by a length from the base portion 45 to the tip of the second long protrusion 53. Further, the projecting length L1 of the first long protrusion 51 is longer than the projecting length L3 of the second long protrusion 53.

One of the two first long protrusions 51, which are the longest ones of the protrusions 51, 52 and 53, is disposed closest to the first crimping pieces 46, and the other is disposed closest to the second crimping piece 47. The two first short protrusions 52 are disposed between the two first long protrusions 51. The two second long protrusions 53 are disposed between and adjacent to the two first short protrusions 52.

As shown in FIG. 5, each first long protrusion 51 has a first chamfered portion 51A (an example of a chamfered portion). The first chamfered portion 51A is shaped by obliquely cutting a corner part formed by the tip edge of the first long protrusion 51 and one side edge closer to the first short protrusion 52, out of two side edges. Each second long protrusion 53 has two second chamfered portions 53A (an example of the chamfered portion). The second chamfered portions 53A are respectively shaped by obliquely cutting two corner parts formed by the tip edge of the second long protrusion 53 and two side edges. By the presence of these chamfered portions 51A, 53A, the mutual interference of the adjacent protrusions 51, 52 and 53 is avoided when the barrel portion 44 is crimped to the cable 10. In this embodiment, any of the chamfered portions 51A, 53A is shaped by cutting the corner part at 45°.

Figure 6:
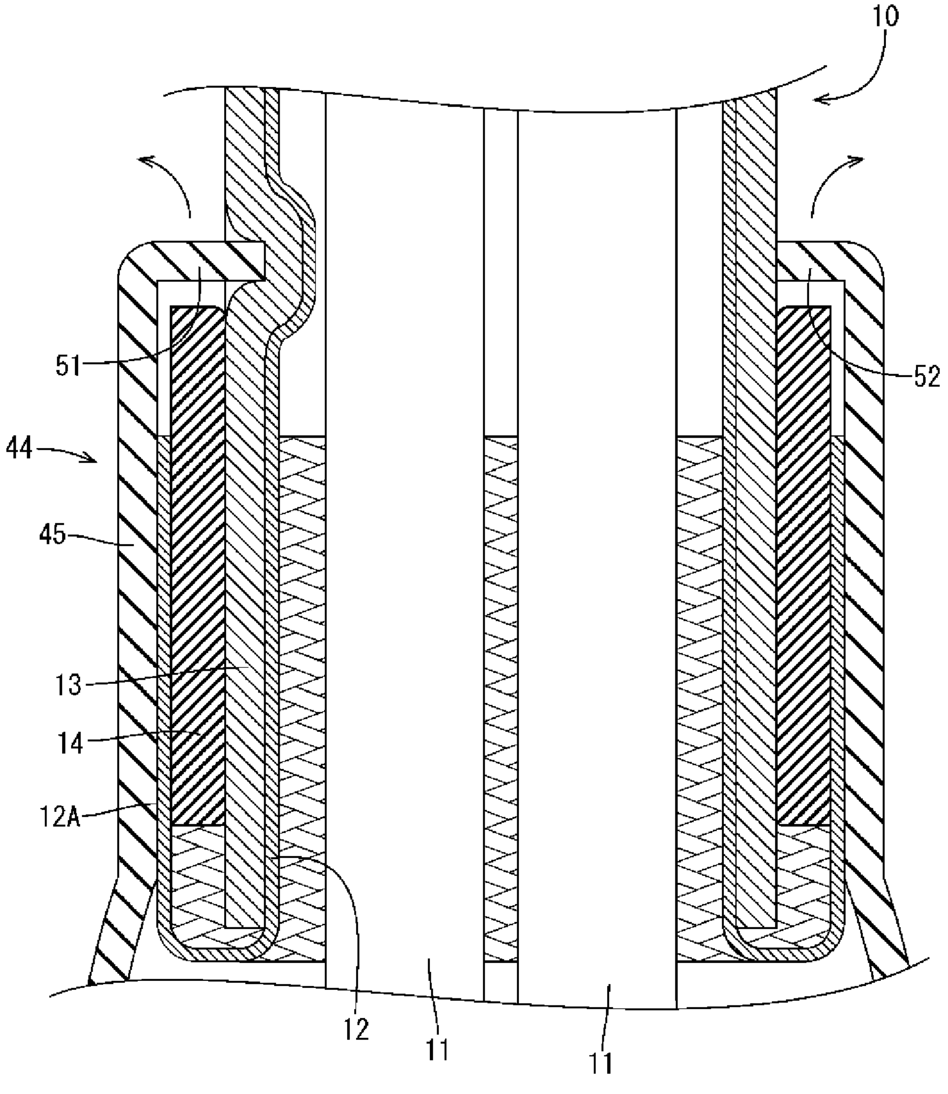
FIG. 6 is a section along A-A of FIG. 4.

With the barrel portion 44 crimped to the end part 10A of the cable 10, the tips of the first and second long protrusions 51, 53 are sinking into the sheath 13. More specifically, as shown in FIGS. 4 and 6, the tips of the first and second long protrusions 51, 53 press and dent parts of the surface of the sheath 13. Further, the tip parts of the first short protrusions 52 are not sinking into the sheath 13. As shown in FIGS. 4 and 6, the first short protrusions 52 have such a length as to be lockable to the end edge of the sleeve 14, and the tips thereof are in contact with the surface of the sheath 13. Note that detailed cross-sectional shapes are not shown for the wires 11, and the entire wires 11 are schematically shown.

The protrusions 51, 52 and 53 may or may not be in contact with the end edge of the sleeve 14 in a state where a tensile force is not applied to the cable 10. However, if a tensile force is applied to the cable 10 in a direction to detach from the barrel portion 44 (upward direction of FIG. 6), the protrusions 51, 52 and 53 are lockable to the end edge of the sleeve 14.

As described above, in this embodiment, the protrusions 51, 52 and 53 include the first and second long protrusions 51, 53 relatively long and sinking into the sheath 13 and the first short protrusions 52 relatively short and not sinking into the sheath 13, but lockable to the sleeve 14. According to this configuration, the detachment of the cable 10 from the barrel portion 44 can be effectively restricted as compared to the case where all the protrusions are sinking into the sheath 13 or none of the protrusions is sinking into the sheath 13. That reason is thought to be as follows.

If a tensile force is applied to the cable 10 in a direction to detach from the barrel portion 44, the sheath 13 pulls the tip parts of the first and second long protrusions 51, 53 sinking into the sheath 13. Further, the sheath 13 withstands a force for moving the sheath 13 in the direction to detach from the sleeve 14 by friction forces acting between the sleeve 14 and the sheath 13 and between the sleeve 14 and the braided wire 12. However, if a large tensile force is applied to the cable 10, the sleeve 14 moves in the direction to detach from the barrel portion 44 together with the sheath 13 and presses the protrusions 51, 52 and 53.

Here, a force is applied to the protrusion 51, 52, 53 in a perpendicular direction and a moment M of the force when the protrusion 51, 52, 53 is opened and deformed (rotated in a direction of an arrow of FIG. 6) is expressed by the following Equation (1).

$$M = FR \tag{1}$$

In Equation (1), R denotes a distance from an axis of rotation to a point of action of the force. The axis of rotation is a boundary line between each of the protrusions 51, 52 and 53 and the base portion 45, and the point of action of the force is a contact position of each of the protrusions 51, 52 and 53 with the sleeve 14 or a contact position of each of the protrusions 51, 52 and 53 with the sheath 13. Further, F denotes a magnitude of the force applied to each of the protrusions 51, 52 and 53.

In other words, the magnitude F of the force necessary to open and deform the protrusion 51, 52, 53 is inversely proportional to the distance R from the axis of rotation to the point of action of the force.

A distance from the axis of rotation to the contact position with the sheath 13 in the protrusion 51, 52, 53 is relatively longer than a distance from the axis of rotation to the contact position with the sleeve 14. As described above, the magnitude F of the force necessary to open and deform the protrusion 51, 52, 53 is inversely proportional to the distance R from the axis of rotation to the point of action of the force. Therefore, if the protrusion is relatively long and sinking into the sheath 13, the protrusion is easily opened and deformed with a smaller force. In contrast, if the protrusion is relatively short and not sinking into the sheath 13, a larger force is necessary to open and deform the protrusion. However, since the sheath 13 is not caught by the protrusion, stress caused by the pulling of the sheath 13 acts not on the protrusion, but on the sleeve 14. In this way, a force applied to the sleeve 14 is larger than when the protrusion is sinking into the sheath 13. Thus, the friction forces acting between the sleeve 14 and the sheath 13 and between the sleeve 14 and the braided wire 12 no longer withstand the tensile force to the cable 10 and the sleeve 14 is easily detached from the sleeve 14.

As just described, the first and second long protrusions 51, 53 relatively long and sinking into the sheath 13 and the first short protrusions 52 relatively short and not sinking into the sheath 13 respectively have advantages and disadvantages. However, if the first long protrusions 51, the second long protrusions 53 and the first short protrusions 52 are used in combination, it is thought that the disadvantages thereof are mutually compensated, a synergetic effect is exhibited, a stronger fixing force is exerted and the detachment of the cable 10 from the barrel portion 44 can be effectively restricted.

As described above, one of the two first long protrusions 51 is disposed closest to the first crimping pieces 46 and the other is disposed closest to the second crimping piece 47. That reason is thought to be as follows.

The sleeve 14 is compressed and deformed when the barrel portion 44 is crimped, whereby the braided wire 12 has an excessive length in a circumferential direction. The excessive length tends to be concentrated near the first and second crimping pieces 46, 47 to be finally wound around the cable 10 in a crimping step of the barrel portion 44. Thus, an interval between the barrel portion 44 and the sleeve 14 easily varies near the first and second crimping pieces 46, 47. Further, in this embodiment, the tongue piece 34 is disposed between the first and second crimping pieces 46, 47 and the folded portion 12A. Also by the presence of this tongue piece 34, the interval between the barrel portion 44 and the sleeve 14 easily varies near the first and second crimping pieces 46, 47. Thus, if short protrusions relatively short and not sinking into the sheath 13 are arranged near the first and second crimping pieces 46, 47, it is difficult to adjust the short protrusions to such a length that the short protrusions do not sink into the sheath 13, but can reliably lock the sleeve 14. The protrusions disposed closest to the first crimping pieces 46 or the second crimping piece 47 are preferably the first long protrusions 51 longest, out of the protrusions 51, 52 and 53, and sinking into the sheath 13.

As shown in FIG. 4, the plurality of protrusions 51, 52 and 53 are arranged to avoid a center position between the both side edges 45E1 and 45E2 of the base portion 45, and are line-symmetrically arranged with a line Ls passing through the center position between the both side edges 45E1 and 45E2 of the base portion 45 and a center position of the barrel portion 44 as an axis of symmetry. In this way, it is suppressed that a force is applied to specific protrusions 51, 52, 53 in a biased manner.

Assembling Process of Cable-Equipped Connector 1

An example of an assembling procedure of the cable-equipped connector 1 according to this embodiment is described.

First, the end of the cable 10 is processed. In the end part 10A of the cable 10, the sheath 13 is stripped to expose the end parts of the wire 11 and the end part of the braided wire 12 from the sheath 13. The braided wire 12 is cut to a predetermined length, and the wires 11 are exposed from the braided wire 12. Subsequently, in the end parts of the wires 11, the insulation coatings are stripped over a predetermined length to expose the core wires from the insulation coatings. Subsequently, the sleeve 14 is externally fit to the end part of the sheath 13. The end part of the braided wire 12 exposed from the sheath 13 is folded and put on the outside of the sleeve 14, thereby forming the folded portion 12A. Subsequently, the terminal fittings are connected to the end parts of the wires 11. Subsequently, the connector housing 20 is assembled with the terminal fittings and the end part 10A of the cable 10.

Subsequently, the shield member 30 is assembled with the connector housing 20. First, the first shield member 31 is assembled with the connector housing 20. The connector housing 20 is accommodated into the tube portion 32, and the tongue piece 34 is placed on the folded portion 12A from outside.

Subsequently, the second shield member 41 is assembled. The two side plates 42B are bent along the tube portion 32 and the covering portion 42 covers the tube portion 32. The barrel portion 44 is crimped to be wound around the end part 10A of the cable 10 and the tongue piece 34 placed on this part from outside. In this way, the assembling of the cable-equipped connector 1 is completed.

Functions and Effects

As described above, according to this embodiment, the cable-equipped connector 1 is provided with the cable 10 including the wires 11, the sheath 13 surrounding the wires 11, the sleeve 14 surrounding the end part of the sheath 13 and the braided wire 12 interposed between the wires 11 and the sheath 13 and having the folded portion 12 exposed from the end part of the sheath 13 and folded on the outside of the sleeve 14, the connector housing 20 connected to the wires 11, and the shield member 30 including the covering portion 42 for covering the connector housing 20, the barrel portion 44 to be crimped to the end part 10A of the cable 10 where the folded portion 12A is disposed and the plurality of protrusions 51, 52 and 53 extending from the barrel portion 44 toward the sheath 13, and the plurality of protrusions 51, 52 and 53 include the first and second long protrusions 51, 53 having the tip parts sinking into the sheath 13 and the first short protrusions 52 shorter than the first and second long protrusions 51, 53 and having such a length that the tip parts thereof are not sinking into the sheath 13, but is lockable to the sleeve 14.

According to the above configuration, the first and second long protrusions 51, 53 relatively long and sinking into the sheath 13 and the first short protrusions 52 relatively short, not sinking into the sheath 13, but lockable to the sleeve 14 are used in combination. In this way, a stronger fixing force is obtained and the detachment of the cable 10 from the barrel portion 44 is effectively restricted as compared to the case where all protrusions are relatively long and sinking into the sheath 13 or all protrusions are relatively short and not sinking into the sheath 13.

Further, the barrel portion 44 includes the base portion 45 to be placed on the end part 10A of the cable 10 and the first and second crimping pieces 46, 47 extending from the base portion 45 and to be wound around the end part 10A of the cable 10, one of the two first long protrusions 51 is disposed closed to the first crimping pieces 46 and the other is disposed closest to the second crimping piece 47.

The interval between the barrel portion 44 and the sleeve 14 easily varies near the first and second crimping pieces 46, 47. Thus, if the first short protrusions 52 are arranged near the first and second crimping pieces 46, 47, it is difficult to adjust the first short protrusions 52 to such a length that the first short protrusions 52 do not sink into the sheath 13, but can reliably lock the sleeve 14. Thus, the protrusions disposed closest to the first crimping pieces 46 or the second crimping piece 47 are preferably the first long protrusions 51 relatively long and configured to sink into the sheath 13.

Modification

Next, a modification is described with reference to FIG. 7. In the modification, a second shield member 60 includes four protrusions 61, 62 extending from the base portion 45 of the barrel portion 44. Out of the four protrusions 51, 52, two are third long protrusions 61 (an example of the long protrusion) and the remaining two are second short protrusions 62 (an example of the short protrusion). One of the two third long protrusions 61 is disposed closest to the first crimping pieces 46, and the other is disposed closest to the second crimping piece 47. The two second short protrusions 62 are disposed between the two third long protrusions 61. A projecting length L4 of the second short protrusion 62 represented by a length from the base portion 45 to the projecting end of the second short protrusion 62 is shorter than a projecting length L5 of the third long protrusion 61 represented by a length from the base portion 45 to the projecting end of the third long protrusion 61.

With the barrel portion 44 crimped to the end part 10A of the cable 10, tip parts of the third long protrusions 61 are sinking into the sheath 13 similarly to the first and second long protrusions 51, 52 of the above embodiment. Further, tip parts of the second short protrusions 62 do not sink into the sheath 13. The second short protrusions 62 may or may not be in contact with the surface of the sheath 13, but have such a length as to be lockable to the end edge of the sleeve 14.

Since the other configuration is the same as in the embodiment, the same components are denoted by the same reference signs and not described.

As just described, a configuration with a relatively small number of the protrusions 61, 62 is suitable when a friction force of the sleeve 14 is relatively large or when the wires 11 have a small outer diameter.

Test Example 1

1. Test Method

1) Text Example 1-1

Five cable-equipped connectors configured similarly to the above modification except that all four protrusions are long protrusions configured to sink into a sheath were prepared as specimens. Cables had a length of 100 mm.

For each specimen, a tensile test was conducted by holding a tip part of a shield member and a rear end part of the cable by a tensile test machine. A tensile speed was 50 mm/min. For each specimen, a maximum load reached before the cable is detached from the shield member was measured and set as a fixing force of the shield member to the cable.

2) Text Example 1-2

Specimens similar to those in Test Example 1-1 above except that one (protrusion located on the left-upper side of FIG. 7) of four protrusions was a short protrusion and the remaining three were long protrusions were prepared, and a tensile test was conducted therefor.

3) Text Example 1-3

Figure 7:
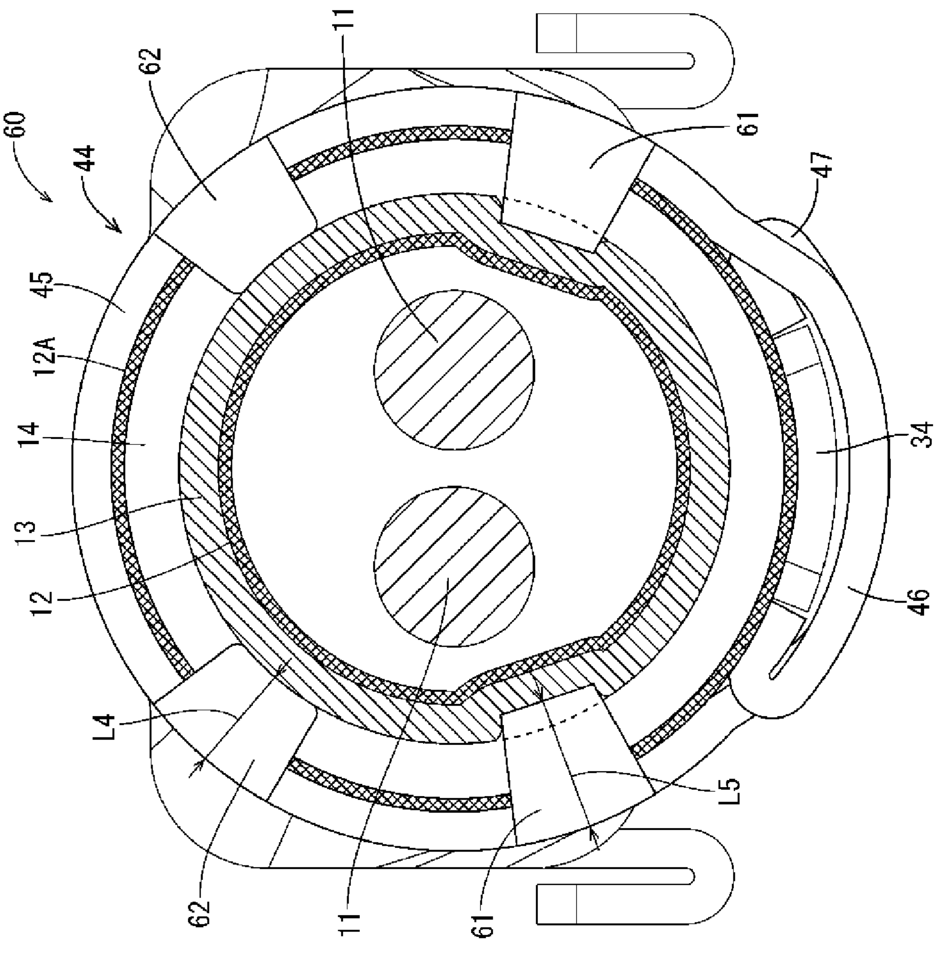
FIG. 7 is a back view of a cable-equipped connector of a modification.

Specimens similar to those in Test Example 1-1 above except that two (protrusions located on the left-upper side and the right-upper side of FIG. 7) of four protrusions were short protrusions and the remaining two were long protrusions were prepared, and a tensile test was conducted therefor.

4) Text Example 1-4

Specimens similar to those in Test Example 1-1 above except that three (protrusions located on the left-upper side, the right-upper side and the right-lower side of FIG. 7) of four protrusions were short protrusions and the remaining one was a long protrusion were prepared, and a tensile test was conducted therefor.

5) Text Example 1-5

Specimens similar to those in Test Example 1-1 above except that all four protrusions were short protrusions were prepared, and a tensile test was conducted therefor.

2. Results

Figure 8:
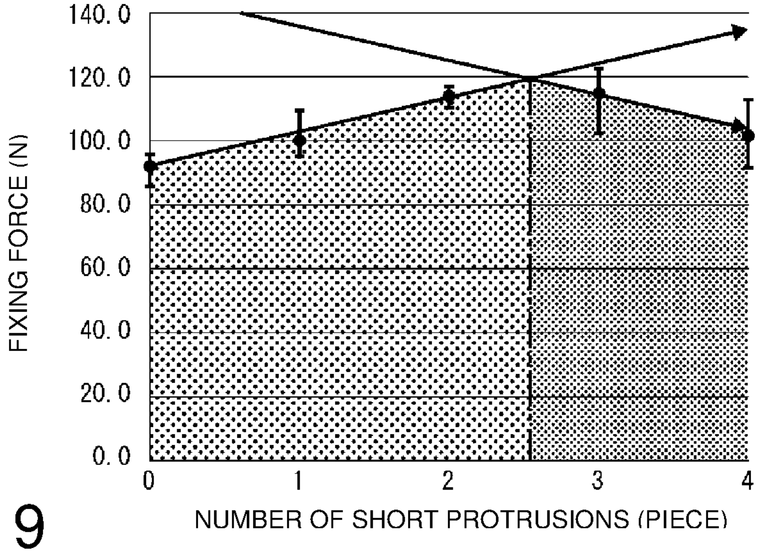
FIG. 8 is a graph showing a relationship of the number of short protrusions and a fixing force in Test Examples 1.

For each test example, an average value, a maximum value and a minimum value of the fixing force, a difference between the maximum value and the average value and a difference between the average value and the minimum value are shown in Table 1 and FIG. 8.

TABLE 1

| | | Number of Short Protrusions | | | | |
|---|---|---|---|---|---|---|
| | | 0 | 1 | 2 | 3 | 4 |
| Fixing Force (N) | Avg Value | 89.8 | 100.6 | 113.5 | 113.7 | 101.3 |
| | Max Value | 96.1 | 109.3 | 117.1 | 122.8 | 112.9 |
| | Min Value | 84.5 | 95.2 | 110.3 | 102.3 | 90.1 |
| | Max Value − Avg Value | 6.3 | 8.7 | 3.6 | 9.1 | 11.6 |
| | Avg Value − Min Value | 5.3 | 5.4 | 3.2 | 11.4 | 11.2 |

From Table 1 and FIG. 8, when the number of the short protrusions was zero, the average value of the fixing force was 89.8 N. Further, the difference between the maximum value and the average value of the fixing force was 6.3 N, the difference between the average value and the minimum value was 5.3 N, and a variation of the fixing force was relatively small. When the number of the short protrusions was one, the average value of the fixing force was 100.6 N and better than when the number of the short protrusions was zero. The difference between the maximum value and the average value of the fixing force was 8.7 N, the difference between the average value and the minimum value was 5.4 N, and a variation of the fixing force was somewhat larger than when the number of the short protrusions was zero. When the number of the short protrusions was two, the average value of the fixing force was 113.5 N and even better than when the number of the short protrusions was one. Further, the difference between the maximum value and the average value of the fixing force was 3.6 N, the difference between the average value and the minimum value was 3.2 N, and a variation of the fixing force was smallest. When the number of the short protrusions was three, the average value of the fixing force was 113.7 N and substantially equal to that when the number of the short protrusions was two. Further, the difference between the maximum value and the average value of the fixing force was 9.1 N, the difference between the average value and the minimum value was 11.4 N, and a variation of the fixing force was considerably larger than when the number of the short protrusions was zero, one or two. When all the protrusions are short protrusions, the average value of the fixing force was 101.3 N and smaller than that when the number of the short protrusions was two or three. Further, the difference between the maximum value and the average value of the fixing force was 11.6 N, the difference between the average value and the minimum value was 11.2 N, and a variation of the fixing force was considerably larger than when the number of the short protrusions was zero, one or two.

When the number of the short protrusions was two or less, the detachment of the cable occurred mainly due to the opening deformation of the protrusions. When the number of the short protrusions was three or more, the detachment of the sleeve from the sheath occurred.

If friction forces acting between the sleeve and the sheath and between the sleeve and the braided wire are thought to be constant, the fixing force is controlled by the moment M of the force when the protrusions are opened and deformed. As described above, since the magnitude F of the force necessary to open and deform the protrusion is inversely proportional to the distance R from the axis of rotation to the point of action of the force, the fixing force is thought to increase as the distance R decreases and as the number of the short protrusions less likely to be opened and deformed increases. On the other hand, if the strength of the protrusion is thought to be constant, the fixing force is controlled by the friction forces acting between the sleeve and the sheath and between the sleeve and the braided wire. Since larger stress caused by the pulling of the sheath 13 is applied to the sleeve 14 as the number of the short protrusions not sinking into the sheath increases, the sleeve is thought to be easily detached from the sheath. As shown in FIG. 8, when the number of the short protrusions is two or less (region to the left of a one-dot chain line of FIG. 8), the fixing force is mainly controlled by the strength of the protrusions. When the number of the short protrusions is three or more (region to the right of the one-dot chain line of FIG. 8), the fixing force is thought to be mainly controlled by the friction forces acting between the sleeve and the sheath and between the sleeve and the braided wire. A synergetic effect of the friction forces and the strength of the protrusions is exhibited most and it is thought to be possible to obtain a stronger fixing force when the number of the short protrusions is two or three.

Further, when the number of the short protrusions is two or less, the fixing force is mainly controlled by the strength of the protrusions. Since a variation in the strength of the protrusions is due to manufacturing tolerances and the like and does not become very large, the variation of the fixing force is thought to be relatively small. In contrast, when the number of the short protrusions is three or more, the fixing force is mainly controlled by the friction forces between the sleeve and the sheath and between the sleeve and the braided wire. Since a timing and a part at which the friction force is eliminated by the tensile force are not stable, the vibration of the fixing force is thought to be large.

As described above, when the total number of the protrusions is four, a highest fixing force is exhibited and the variation of the fixing force is smallest when the number of the short protrusions is two, which is preferable.

Test Example 2

1. Test Method

1) Text Example 2-1

Five cable-equipped connectors configured similarly to the above embodiment except that all six protrusions are long protrusions configured to sink into a sheath were prepared as specimens. Cables had a length of 100 mm. For each specimen, a tensile test was conducted as in Text Examples 1 above.

2) Text Example 2-2

Specimens similar to those in Test Example 2-1 above except that two of six protrusions were short protrusions and the remaining four were long protrusions were prepared, and a tensile test was conducted therefor. Note that the arrangement of the two short protrusions was similar to that of the first protrusions 52 shown in FIG. 4.

3) Text Example 2-3

Specimens similar to those in Test Example 2-1 above except that all six protrusions are short protrusions were prepared, and a tensile test was conducted therefor.

2. Results

Figure 9:
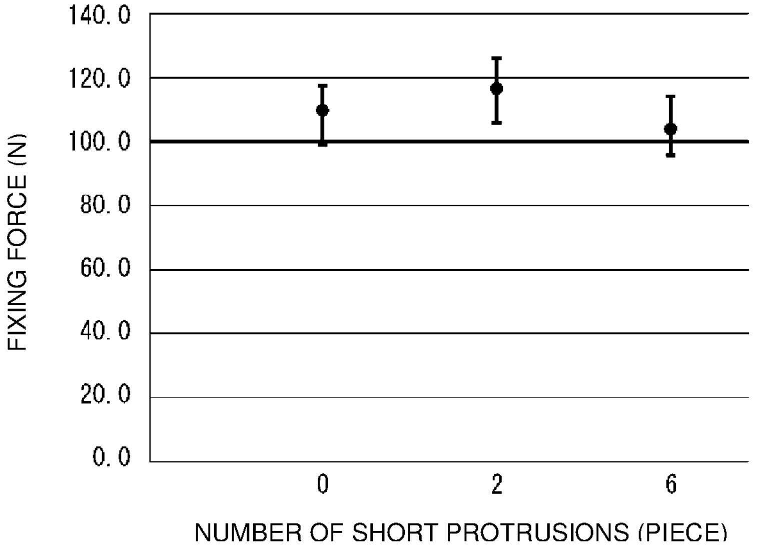
FIG. 9 is a graph showing a relationship of the number of short protrusions and a fixing force in Test Examples 2.

For each test example, an average value, a maximum value and a minimum value of the fixing force, a difference between the maximum value and the average value and a difference between the average value and the minimum value are shown in Table 2 and FIG. 9.

TABLE 2

| | | Number of Short Protrusions | | |
|---|---|---|---|---|
| | | 0 | 2 | 6 |
| Fixing Force (N) | Avg Value | 108.5 | 116.4 | 105.5 |
| | Max Value | 117.1 | 125.9 | 114.2 |
| | Min Value | 98.7 | 106.1 | 95.4 |
| | Max Value − Avg Value | 8.6 | 9.5 | 8.7 |
| | Avg Value − Min Value | 9.8 | 10.3 | 10.1 |

From Table 2 and FIG. 9, when the number of the short protrusions was zero, the average value of the fixing force was 108.5 N. Further, the difference between the maximum value and the average value of the fixing force was 8.6 N, and the difference between the average value and the minimum value was 9.3 N. When the number of the short protrusions was two, the average value of the fixing force was 116.4 N and best. Further, the difference between the maximum value and the average value of the fixing force was 9.5 N, and the difference between the average value and the minimum value was 10.3 N. When the number of the short protrusions was six, the average value of the fixing force was 105.5 N. Further, the difference between the maximum value and the average value of the fixing force was 8.7 N, and the difference between the average value and the minimum value was 10.1 N. A large difference was not seen in the variation of the fixing force. However, the fixing force was at least 106.1 N and exceeded 100 N when the number of the short protrusions was two, whereas the minimum value of the fixing force fell below 100 N when the number of the short protrusions was zero and six. As just described, when the number of the short protrusions was two, the fixing force was highest and the minimum value of the fixing force exceeded 100 N. As just described, even when the total number of the protrusions was six, a best result was obtained when the number of the short protrusions was two.

Figure 10:
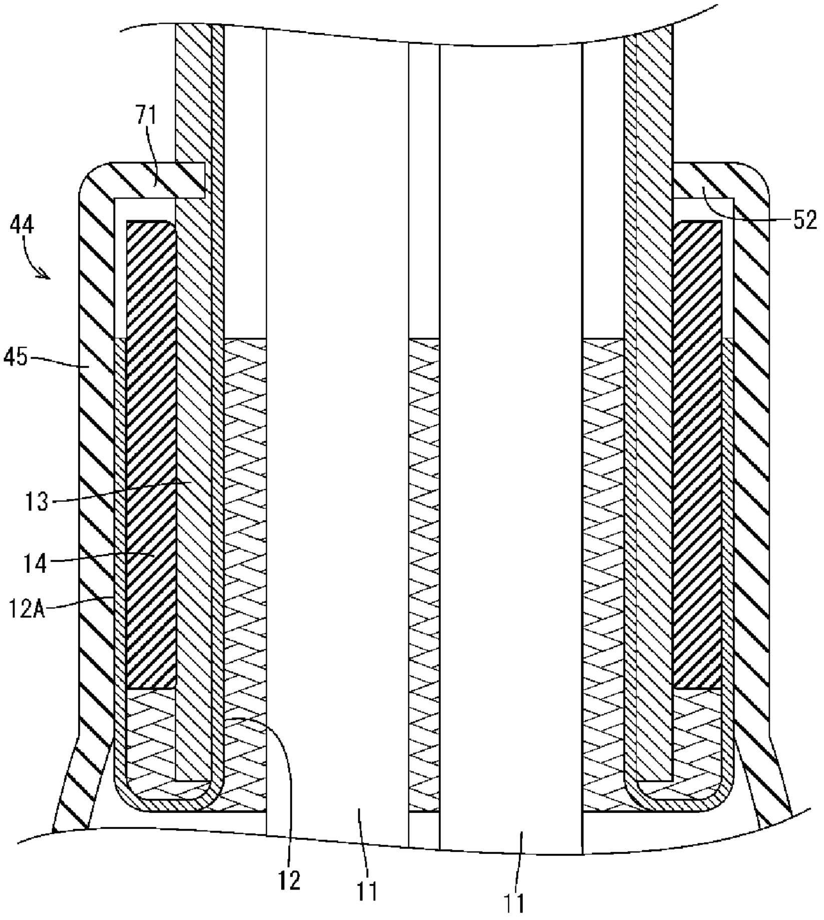
FIG. 10 is a section along A-A of FIG. 4 of a cable-equipped connector in another embodiment.

OTHER EMBODIMENTS (1) In the above embodiment, the tip parts of the first long protrusions 51 press and dent the parts of the surface of the sheath 13 with the barrel portion 44 crimped to the end part 10A of the cable 10. However, in the technique disclosed by this specification, that the protrusion is "sinking into the sheath" means also a state where a tip part of a fourth long protrusion 71 (an example of the long protrusion) cuts through the surface of the sheath 13 and is stuck in the sheath 13 as shown in FIG. 10. In this case, preferably, the fourth long protrusion 71 is not pierced through the sheath 13. This is due to a concern that the sheath is torn off when a tensile force is applied to the cable if the long protrusion is pierced through the sheath.

(2) Although the total number of the protrusions is six in the above embodiment and four in the modification, the total number of the protrusions and the numbers of the long protrusions and the short protrusions can be arbitrarily set according to the number of the wires, outer diameters of the sheath and the sleeve and the like.

(3) Although the first long protrusions 51 have the first chamfered portions 51A and the second long protrusions 53 have the second chamfered portions 53A in the above embodiment, the long protrusions may not have the chamfered portions, for example, if intervals between adjacent ones of the protrusions are wide and there is no possibility of mutual interference.

(4) Although the chamfered portions 51A, 53A are shaped by cutting the corner parts at 45° in the above embodiment, the chamfered portions may be shaped by roundly and smoothly cutting the corner parts.

(5) The plurality of protrusions may or may not be arranged at equal intervals.

LIST OF REFERENCE NUMERALS

1: cable-equipped connector
10: cable
10A: end part
11: wire
12: braided wire
12A: folded portion
13: sheath
14: sleeve
20: connector housing
30: shield member
31: first shield member
32: tube portion
33: first coupling portion
34: tongue piece
41: second shield member
42: covering portion
42A: ceiling plate
42B: side plate
43: second coupling portion
44: barrel portion
45: base portion
45E1, 45E2: side edge
46: first crimping piece
46A: first open stop piece
47: second crimping piece
47A: second open stop piece
51: first long protrusion (protrusion, long protrusion)
51A: first chamfered portion (chamfered portion)
52: first short protrusion (protrusion, short protrusion)
53: second long protrusion (protrusion, long protrusion)
53A: second chamfered portion (chamfered portion)
60 second shield member
61: third long protrusion (protrusion, long protrusion)
62: second short protrusion (protrusion, short protrusion)
71: fourth long protrusion (protrusion, long protrusion)
L1 projecting length of first long protrusion
L2 projecting length of first short protrusion
L3: projecting length of second long protrusion
LA projecting length of second short protrusion
L5 projecting length of third long protrusion
Ls: line

What is claimed is:

1. A cable-equipped connector, comprising:
a cable including:
a wire;
a sheath surrounding the wire;
a sleeve surrounding an end part of the sheath; and
a braided wire interposed between the wire and the sheath, the braided wire including a folded portion exposed from the end part of the sheath and folded on outside of the sleeve;
a connector housing connected to the cable; and
a shield member including a covering portion for covering the connector housing, a barrel portion to be crimped to an end part of the cable where the folded portion is disposed, and a plurality of protrusions extending from the barrel portion toward the sheath,
the plurality of protrusions including at least one long protrusion having a tip part sinking into the sheath and at least one short protrusion shorter than the long protrusion and having such a length that a tip part does not sink into the sheath, but is lockable to the sleeve, and
a pair of the long protrusions being disposed on both sides of the short protrusion in a circumferential direction of the wire.

2. The cable-equipped connector according to claim 1, wherein:
the barrel portion includes a base portion to be placed on the end part of the cable and a crimping piece extending from the base portion and to be wound around the end part of the cable, and
at least a part of the long protrusion is disposed closest to the crimping piece.

3. The cable-equipped connector according to claim 1, wherein a total number of the protrusions provided in the shield member is four and two of the protrusions are the short protrusions.

4. The cable-equipped connector according to claim 1, wherein a total number of the protrusions provided in the shield member is six and two of the protrusions are the short protrusions.

* * * * *